United States Patent
Franssson et al.

(10) Patent No.: US 10,247,909 B2
(45) Date of Patent: Apr. 2, 2019

(54) FOCUSING OF A CAMERA MONITORING A SCENE

(71) Applicant: Axis AB, Lund (SE)

(72) Inventors: Kent Fransson, Lund (SE); Bjorn Berglund, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/802,612

(22) Filed: Nov. 3, 2017

(65) Prior Publication Data
US 2018/0180841 A1 Jun. 28, 2018

(30) Foreign Application Priority Data
Dec. 22, 2016 (EP) .................................... 16206145

(51) Int. Cl.
*G02B 7/28* (2006.01)
*G03B 13/36* (2006.01)
*G08B 13/196* (2006.01)
*H04N 5/225* (2006.01)
*H04N 5/232* (2006.01)
*H04N 5/33* (2006.01)
*G02B 7/32* (2006.01)
*G02B 7/36* (2006.01)

(52) U.S. Cl.
CPC ............. *G02B 7/285* (2013.01); *G02B 7/287* (2013.01); *G02B 7/32* (2013.01); *G02B 7/365* (2013.01); *G03B 13/36* (2013.01); *G08B 13/196* (2013.01); *H04N 5/2254* (2013.01); *H04N 5/23212* (2013.01); *H04N 5/23245* (2013.01); *H04N 5/332* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 2008/0174691 A1 | 7/2008 | Polidor et al. | |
| 2014/0063261 A1 | 3/2014 | Betensky et al. | |
| 2016/0142681 A1* | 5/2016 | Yu .......................... | H04N 7/183 348/143 |
| 2016/0301852 A1 | 10/2016 | Krishnamurthy Sagar et al. | |
| 2018/0059248 A1* | 3/2018 | O'Keeffe .............. | G01S 7/4817 |

FOREIGN PATENT DOCUMENTS

CN 204836402 12/2015

OTHER PUBLICATIONS

Extended European Search Report dated Jul. 4, 2017 in European application 16206145.1, filed on Dec. 22, 2016.

* cited by examiner

*Primary Examiner* — James M Hannett
(74) *Attorney, Agent, or Firm* — Oblon, McClelland, Maier & Neustadt, L.L.P.

(57) ABSTRACT

Focusing of a monitoring camera (100) with day and night functionality comprises selecting a focusing day mode or a focusing night mode based on the camera being in day mode or night mode. In focusing day mode, an IR laser range meter (110) will measure a reference distance continuously, and in the focusing night mode the IR laser range meter will only measure reference distance in response to a focus trigger signal being activated, and during a predetermined time period. The focus distance of the camera is set based on the measured reference distance.

11 Claims, 1 Drawing Sheet

FOCUSING OF A CAMERA MONITORING A SCENE

TECHNICAL FIELD

The present invention relates to the field of monitoring cameras. In particular, it relates to focusing of such a camera.

BACKGROUND

Monitoring cameras are used in various scenarios, both indoors and outdoors. In many situations, it is valuable to be able to quickly focus the camera so that sharp and useful images can be provided depicting any objects of interest in a scene.

Automatic focusing, autofocus or AF, methods used to set focus of monitoring cameras may be divided into two main groups: passive AF methods and active AF methods. Some common passive AF methods are based on analysing the contrast of images captured by the camera for different settings of the focus lens system, and then selecting a focus position that gives the highest (or at least a high) value of contrast. There also exist other passive AF methods which are based on detecting phase differences, e.g., using specially designed focus pixels.

Active AF methods are based on performing a distance measurement to an object in the monitored scene using a range metering device, such as a radar or a laser range meter. The camera is set to focus on the distance measured by the range meter. Active AF methods are usually much faster than passive, contrast-based AF methods, and they also work better in a low-light environment where the contrast of the images is lower.

If a laser range meter is used, a low impact laser operating in the infrared, IR, spectrum is a common choice, providing an energy efficient and safe option. Since monitoring cameras already are provided with a filter for filtering out IR light, a so called IR-cut filter, the laser can be used without being visible in the images captured by the camera.

Some monitoring cameras offer both day and night functionality, such as those designed to be used in outdoor installations or in indoor environments with poor lighting. When in day mode, the camera IR-cut filter filters out IR light such that it does not distort the colours of the images as the human eye sees them, but when the camera is in night mode, the IR-cut filter is removed, thereby allowing the light sensitivity of the camera to reach down to 0.001 lux or lower. Near-infrared light, which spans from 700 nm up to about 1000 nm, is beyond what the human eye can see, but most camera sensors can detect it and make use of it.

Thus, when in day mode, i.e., when the light in the scene is above a certain level, the camera delivers colour images. As light diminishes below the certain level, the camera switches to night mode to make use of near infrared (IR) light to deliver high-quality black and white images.

However, when a camera with day and night functionality is equipped with active AF using an IR laser range meter, there will be a problem that the light from the IR laser is visible in the images when the IR cut filter is removed. This is easily solved by deactivating the IR laser meter when the camera is operating in night mode. However, it would be desirable to solve this problem in a different manner, especially since, as mentioned above, passive AF methods based on contrast measurement are less efficient in low light environments.

SUMMARY OF THE INVENTION

In view of the above, it is thus an object of the present invention to provide a method of focusing a camera which enables use of active AF for a camera having day and night functionality.

According to a first aspect of the invention, the above object is achieved by a method of focusing a camera monitoring a scene, the camera being operable in a day mode and in a night mode, wherein an infrared, IR, cut filter blocks IR light from reaching the camera in the day mode, and allows IR light to reach the camera in the night mode, wherein the method comprises
  i) receiving input on whether the camera is operated in the day mode or the night mode,
  ii) selecting a focusing day mode if the camera is operated in the day mode and a focusing night mode if the camera is operated in the night mode, wherein
    a) the focusing day mode comprises controlling an IR laser range meter to continuously measure a reference distance, and
    b) the focusing night mode comprises controlling the IR laser range meter to only measure the reference distance in response to a focus trigger signal being activated, and during a predetermined time period,
  iii) setting the focus distance of the camera based on the measured reference distance.

In this way active AF by use of the IR laser range meter can be utilized both during day and night operation of the camera, without the IR light impacting the images captured by the camera in any major way. This in turn greatly speeds up the time to achieve correct focus also during night time.

The method may further comprise the step of measuring a light level of the scene, and the camera may be controlled to operate in the day mode if the light level is above a predetermined threshold, and to operate in the night mode if the light level is below the predetermined threshold.

The light level may be measured by estimating the brightness of images captured by the camera or by a light meter performing a measurement of the light level in the scene. In this way the camera may receive relevant input in order to select a correct operating mode for capturing high quality images in varying light conditions.

The IR laser range meter may measure the reference distance by emitting IR laser pulses having a wavelength of 900-910 nm, and preferably having a wavelength of 905 nm. Using this part of the IR spectrum aids in making certain that the laser will not emit any harmful radiation, while still allowing the laser range meter to be able to perform distance measurements within the ranges of distances that are of interest in most common monitoring scenarios. Also, using IR light obviously means that during day mode the laser light will not be visible in the images captured by the camera.

The predetermined time period, during which the laser range meter measures the reference distance during the focusing night mode, may be 0.1-0.5 seconds. During this time the laser range meter will normally be able to find a reference distance, but the impact on the images captured by the camera will be marginal. Using such a short time period also means that the camera will not have time to start adapting parameters for image capturing and image encoding based on the images captured during such a short period.

The camera may optionally discard the images that are captured during the predetermined time period. As an example, the camera may instead use an image captured right before the predetermined time period starts. The image from the camera will appear to be frozen, but since it will only be for a very short time it will hardly be noticeable to a viewer. This further reduces the risk of the camera adapting any parameters for image capturing and image encoding based on images including the light from the IR laser range meter.

The focus trigger signal activation may be based on one or more of the following: input indicating a stop of a movement of the camera, input from a user interface requesting refocusing of the camera, input from an image analyzer indicating a predetermined change in the scene, and input from a refocusing scheduling unit configured to trigger refocus of the camera according to a pre-determined time schedule.

The input indicating a stop of a movement of the camera may in turn comprise one or more of: receiving input from a camera movement sensor, preferably from one or more of an accelerometer and a gyro sensor, indicating that a movement of the camera has stopped, receiving input from a pan-tilt motor indicating that a pan-tilt movement of the camera has stopped, receiving input from an image analyzer indicating stopped movement of the camera in relation to the scene.

All of these options are examples of situations where it is highly likely that the focus of the camera needs to be adjusted and where it is valuable to be able to use the IR laser range meter to obtain a reference distance. The various inputs are easily found based on already available, or easily provided, camera functions and features.

The method of focusing may comprise performing an adjustment of the focus distance of the camera, based on contrast measurements of images captured by the camera. In other words, a passive, contrast based, AF algorithm may be used to further refine the focus setting of the camera, based on the focus distance set based on the reference distance measure by the laser range meter. Since such passive, contrast based focus methods will give a more precise focus setting, this step will improve the sharpness, and thereby quality, of the images captured by the camera even further.

According to a second aspect of the invention, the above object is achieved by a camera arranged to monitor a scene, comprising
an infrared, IR, cut filter, arranged to block IR light from reaching the camera in a day mode, and arranged to allow IR light to reach the camera in a night mode,
a focusing unit for setting a focus distance of the camera, the focusing unit comprising an IR laser range meter,
wherein the focusing unit is arranged to
receive input on whether the camera is operated in the day mode or in the night mode, and,
select a focusing day mode if the camera if operated in the day mode, and a focusing night mode if the camera is operated in the night mode, wherein
in the focusing day mode, the focusing unit is arranged to control the IR laser range meter to continuously measure a reference distance, and
in the focusing night mode, the focusing unit is arranged to control the IR laser range meter to only measure the reference distance in response to a focus trigger signal being activated, and during a predetermined time period,
set the focus distance of the camera based on the measured reference distance.

The camera may further comprise a pan-tilt motor arranged to move the camera such that the field of view of the camera is moved in at least one of a pan and a tilt direction.

The second aspect may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [unit, event, signal, step etc.]" are to be interpreted openly as referring to at least one instance of said unit, event, signal, step etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
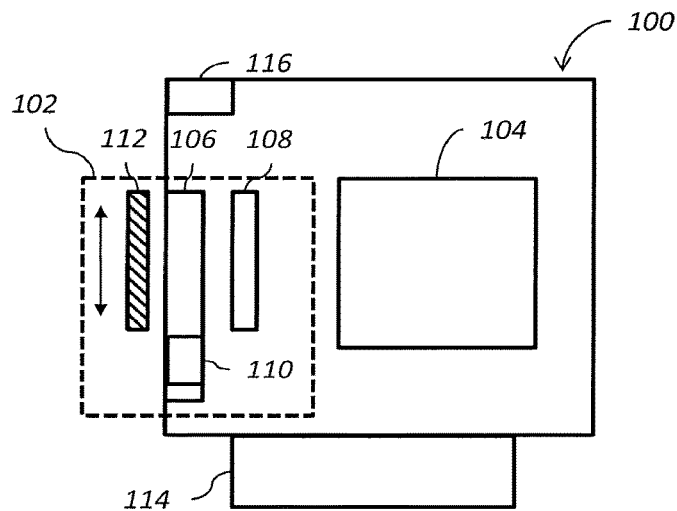
FIG. 1 illustrates a camera equipped with a laser range meter and an IR cut filter.

FIG. 1 schematically illustrates a monitoring camera 100. The camera is arranged to monitor a scene and comprises an image capturing unit 102 and an image processing unit 104. Images captured by the image capturing unit 102 are processed by the image processing unit 104. The image processing unit 104 may be arranged to provide noise filtering and other enhancement of the image, as well as performing image analytics, such as video motion detection, and encoding of images. Elements of the image processing unit may be embodied in software or in hardware.

The image capturing unit 102 comprises a focusing unit 106 and an image sensor 108. The focusing unit comprises an IR laser range meter 110. On or more focusing lenses are also provided (not shown for sake of simplicity). The focusing unit further comprises elements, embodied in software or hardware, for controlling the operation of the focusing unit.

The image capturing unit also includes an IR cut filter 112. The IR cut filter is an optical filter which filters out infrared, IR, light. The two-ended arrow at the IR cut filter 112 symbolizes that it may be moved between a first position where it blocks IR light from reaching the camera, or more precisely the image sensor 108, to a second position where it allows IR light to reach the camera, or more precisely, the image sensor 108. In FIG. 1 the IR cut filter 112 is illustrated as being placed in front of the focusing unit 106, but in other configurations the IR cut filter may be placed between the focusing unit 106 and the image sensor 108. Instead of a filter being physically moved between a blocking position and a non-blocking position, the IR cut filter may also be implemented as a tunable optical filter which can be electronically controlled to allow selected wavelengths to pass or not to pass.

The camera 100 has day and night functionality, i.e. it is operable in a day mode and in a night mode. When the camera operates in day mode, the IR cut filter will block IR light from reaching the camera, meaning that the images delivered by the camera will not visualize any IR input. In night mode, on the other hand, the IR filter will be set to allow IR light to reach the camera, thereby enabling the camera to deliver images including IR input. As mentioned previously, in night mode the camera is much more light sensitive, but will on the other hand only deliver black and white images.

The camera will usually be able to switch automatically between day mode and night mode, based on the amount of light in the scene, such that when the amount of light is above a threshold value, day mode will be selected, and otherwise, night mode will be selected. The amount of light in the scene can be determined based on the brightness of captured images, which is typically determined by the image processing unit, or by measurement of the light level, using a dedicated light meter. The light meter can either be part of the camera, such as is schematically illustrated by light meter 116, or be external to the camera, e.g., placed in a relevant part of the monitored scene. Other means of switching between day mode and night mode may also be provided, such as switching mode based on a pre-defined schedule, user input or other events.

The focusing unit 106 is arranged to focus the camera, usually by moving one or more focus lenses to set a focus distance which allows the camera to capture sharp images of the scene, or at least selected parts thereof. As discussed previously, a camera may use a passive, such as a contrast-based, focusing method, or an active focusing method, or a combination of the two. In the present application, the camera is equipped with an IR laser range meter 110 which measures a reference distance to an object in the scene by emitting IR laser pulses and measuring the travel time of the reflected pulses. The reference distance is then used by the focusing unit to set the focus distance. The settings of the focus lenses in the focusing unit have a predetermined relationship to the focus distance, and typically the positions of the focus lenses are adjusted so that the focus distance is set to the reference distance.

It may be noted that the IR laser range meter 110 is usually set to emit laser pulses towards the part of the scene being in the central region of the camera's current field of view, as this will normally be the part of the scene which is of most interest to a user. A common choice of wavelength for the IR laser pulses is 900-910 nm, with 905 nm being the most common choice.

Based on whether the camera is operated in day mode or in night mode, the focusing unit selects a focusing day mode or a focusing night mode for its operation. In the focusing day mode, the IR laser range meter will measure the reference distance continuously, such that the camera is continuously able to set a focus distance based on the measured reference distance. The focusing unit may also perform an additional focusing refinement around the focus distance set based on the reference distance. This may be based on a passive AF method such as contrast measurements in images taken at slightly different focus distances.

When the camera is operated in the night mode, the focusing unit will select the focusing night mode. In this mode the laser is only operated during a predetermined time period and in response to a focus trigger signal. When the predetermined time period ends, and as long as no new focus trigger signal is activated, the IR laser range meter will not emit any laser pulses, i.e. the camera focusing unit will not receive any new reference distance from the IR laser range meter until the focus trigger signal is activated again.

This way of operating the IR laser range meter will mean that the IR light from the laser will have as little as possible impact on the captured images while still keeping the advantage of a much faster focusing of the camera in a situation when it is highly likely that a refocusing of the camera is needed, compared to if only a passive, contrast-based AF method is used. The pre-determined time period for measuring the reference distance in the focusing night mode is preferably very short, such as 0.1-0.5 seconds. At a frame rate of 30 fps, the IR light will then only be present in 3-15 image frames, in other words a very low number of frames.

As an option, the camera may be set to discard the image frames that are captured during the time period when the IR laser is emitting laser pulses. The image stream sent from the camera will then appear to be frozen for a very short time, which most likely will not be noticeable to a user. The camera could e.g., be set to simply resend an image frame which is captured just before the predetermined time period starts.

The camera 100 further includes a pan-tilt motor 114 which is arranged to move the camera 100 such that the field of view of the camera is moved in at least one of a pan (usually horizontal) or tilt (normally vertical) direction. The control of the pan-tilt motor may, e.g., take place via a user interface where a user may direct the camera to view a selected part of the scene. Another option is that the pan-tilt motor is controlled to move the camera's field of view according to a predefined guard tour, such as between a plurality of preset positions or according to any other type of pre-scheduled instructions. The pan-tilt motor could also be set to move the camera based on a trigger from an external sensor, such as a PIR sensor detecting movement in a part of the scene.

The focus trigger signal may be activated based on a movement of the camera being stopped, usually a movement of the camera's field of view in at least one of a pan or tilt direction. A common situation is that the pan-tilt motor has moved the camera and then stopped, so that the field of view is covering a new part of the scene. The focus setting from before the movement is in this situation often no longer correct, i.e. the camera is delivering unsharp images. In this situation it is important to quickly regain focus, and therefore a focus trigger signal may be activated when it is detected that movement of the pan-tilt motor has stopped. The focus trigger signal may therefore be based on input indicating that a movement, typically a pan-tilt movement, of the camera has stopped. The IR laser range meter then quickly, during the predetermined time period, measures a reference distance, and this distance is used to set the focus distance. An additional passive, contrast-based, focusing may then take place.

Even though it might be a less than perfect reference distance measurement which is achieved by the IR laser range meter due to the short time available, having any reference distance measurement will greatly reduce the time to achieve a sharp image compared to the situation when focus is set based using only a contrast based AF method. Being able to set an approximately correct focus distance based on this possibly less than perfect reference distance will also be a great advantage in a situation where strong light sources in the scene will make focusing based on contrast nearly impossible.

The input regarding stopped movement of the pan-tilt motor may be received from the pan-tilt motor itself, such as from a controller of the pan-tilt motor, but it would also be possible to detect such movement and the cessation thereof by a movement sensor, e.g., an accelerometer or a gyro sensor, which senses movement of the camera. Another option is to use input from the image processing unit, more in detail from an analysis of images to determine if there is a movement of the camera in relation to the scene and if such a movement has stopped. The part of the image processing unit performing such an analysis may be denoted an image analyser, and may be implemented in hardware or software, and the movement and cessation of movement may e.g., be determined based on a comparison between a plurality of successive image frames.

Other input than input indicating a stopped movement of the camera may also be used to activate the focus trigger signal. Input can be received from a user interface, where a user may enter a request to refocus the camera. Another option is that the focus trigger signal is activated based on an analysis of images of the scene indicating that some kind of predetermined change, or event, has taken place. The image processing unit may perform this analysis, again using a unit denoted an image analyser to detect this change or event. This unit may be implemented in hardware or software, and may or may not be the same unit used to detect stopped movement of the camera in relation to the scene. The predetermined change may e.g., be the entry of an object in a part of the scene which is currently not in focus. Additional inputs could also be used to activate the focus trigger signal, such as input from a sensor external to the camera, e.g., a PIR sensor detecting movement of an object.

Figure 2:
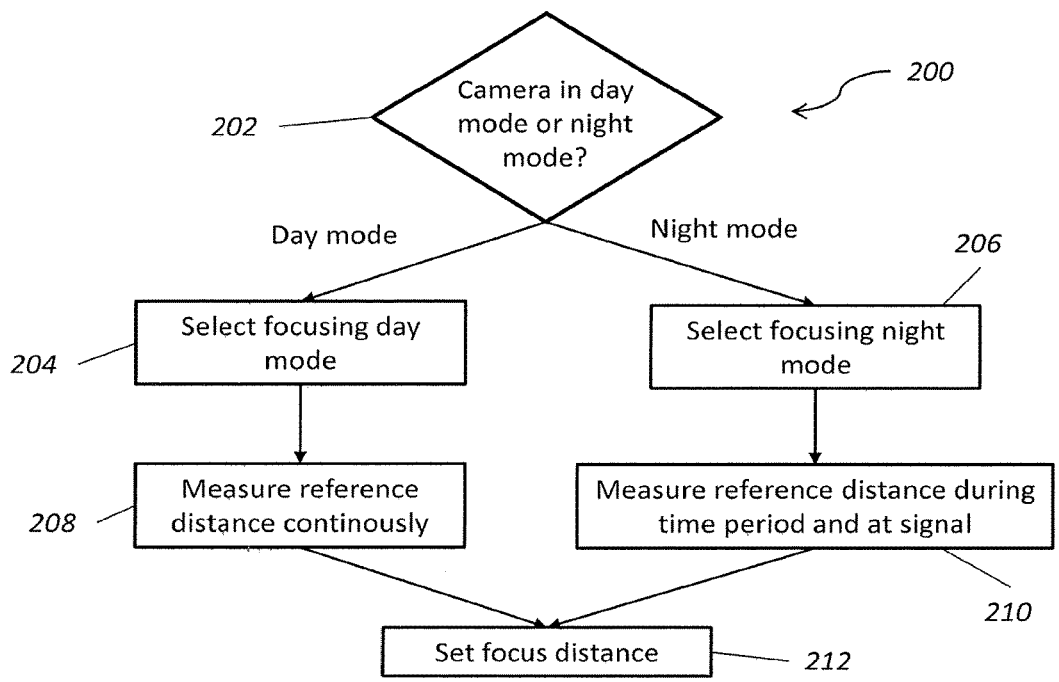
FIG. 2 illustrates a method of focusing a camera.

FIG. 2 illustrates a method 200 according to embodiments of the invention. In step 202 input is received indicating whether the camera is in day mode or in night mode. If the camera is in day mode, a focusing day mode is selected in step 204, and if the camera is in night mode, a focusing night mode is selected in step 206. If the focusing day mode was selected, the IR laser range meter will measure a reference distance continuously in step 208, and if the focusing night mode was selected, the IR laser range meter will measure the reference distance only in response to a focus trigger signal being activated and during a predetermined time period in step 210. Finally, in step 212, the focus distance of the camera will be set based on the measured reference distance. As noted above, an additional step of refining the focus setting of the camera by a passive, contrast based, AF method may also take place.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method of focusing a camera monitoring a scene, the camera being operable in a day mode and in a night mode, wherein an infrared, IR, cut filter blocks IR light from reaching the camera in the day mode, and allows IR light to reach the camera in the night mode, wherein the method comprises
   i) receiving input on whether the camera is operated in the day mode or the night mode,
   ii) selecting a focusing day mode if the camera is operated in the day mode and a focusing night mode if the camera is operated in the night mode, wherein
      a) the focusing day mode comprises controlling an IR laser range meter to continuously measure a reference distance, and
      b) the focusing night mode comprises controlling the IR laser range meter to only measure the reference distance in response to a focus trigger signal being activated, and during a predetermined time period,
   iii) setting the focus distance of the camera based on the measured reference distance.

2. The method of claim 1, further comprising the step of measuring a light level of the scene, and controlling the camera to operate in the day mode if the light level is above a predetermined threshold, and to operate in the night mode if the light level is below the predetermined threshold.

3. The method of claim 2, wherein the light level is measured by estimating brightness of images captured by the camera or by a light meter performing a measurement of the light level in the scene.

4. The method of claim 1, further comprising the IR laser range meter measuring the reference distance by emitting IR laser pulses having a wavelength of 900-910 nm, and preferably having a wavelength of 905 nm.

5. The method of claim 1, wherein the predetermined time period is 0.1-0.5 seconds.

6. The method of claim 1, further comprising the camera discarding images captured during the predetermined time period.

7. The method of claim 1, further comprising the step of activating the focus trigger signal based on one or more of the following:
   input indicating a stop of a movement of the camera,
   input from a user interface requesting refocusing of the camera,
   input from an image analyzer indicating a predetermined change in the scene, and
   input from a refocusing scheduling unit configured to trigger refocus of the camera according to a predetermined time schedule.

8. The method of claim 7, wherein the step of activating the focus trigger signal based on input indicating a stop of a pan-tilt movement of the camera comprises one or more of
   receiving input from a camera movement sensor, preferably from one or more of an accelerometer and a gyro sensor, indicating that a movement of the camera has stopped,
   receiving input from a pan-tilt motor indicating that a movement of the camera has stopped,
   receiving input from an image analyzer indicating stopped movement of the camera in relation to the scene.

9. The method of claim 1, further comprising performing an adjustment of the focus distance of the camera, based on contrast measurements of images captured by the camera.

10. A camera arranged to monitor a scene, comprising
   an infrared, IR, cut filter, arranged to block IR light from reaching the camera in a day mode, and arranged to allow IR light to reach the camera in a night mode,
   a focusing unit for setting a focus distance of the camera, the focusing unit comprising an IR laser range meter, wherein the focusing unit is arranged to
      receive input on whether the camera is operated in the day mode or in the night mode, and,
      select a focusing day mode if the camera if operated in the day mode, and a focusing night mode if the camera is operated in the night mode, wherein
         in the focusing day mode, the focusing unit is arranged to control the IR laser range meter to continuously measure a reference distance, and
         in the focusing night mode, the focusing unit is arranged to control the IR laser range meter to only measure the reference distance in response to a focus trigger signal being activated, and during a predetermined time period, set the focus distance of the camera based on the measured reference distance.

11. The camera of claim 10, further comprising a pan-tilt motor arranged to move the camera such that a field of view of the camera is moved in at least one of a pan and a tilt direction.

* * * * *